(12) United States Patent
Trabert et al.

(10) Patent No.: US 7,411,759 B2
(45) Date of Patent: Aug. 12, 2008

(54) DETECTION AND MEASUREMENT OF POSITION ERROR SIGNAL LINEARITY IN TIMING BASED SERVO PATTERNS USING DIFFERENTIAL NONLINEARITY

(75) Inventors: Steven G. Trabert, Boulder, CO (US); Kevin D. McKinstry, Louisville, CO (US); Hubert O. Hayworth, Ft. Lupton, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/554,961

(22) Filed: Oct. 31, 2006

(65) Prior Publication Data

US 2008/0100952 A1    May 1, 2008

(51) Int. Cl.
    *G11B 5/584*    (2006.01)
(52) U.S. Cl. ...................................... 360/75; 360/77.12
(58) Field of Classification Search .................. None
    See application file for complete search history.

(56) References Cited

U.S. PATENT DOCUMENTS

| | | | |
|---|---|---|---|
| 6,031,673 A * | 2/2000 | Fasen et al. | 360/77.12 |
| 6,700,729 B1 * | 3/2004 | Beck et al. | 360/77.12 |
| 6,724,561 B1 * | 4/2004 | Wyman | 360/77.12 |
| 6,865,050 B2 * | 3/2005 | Nakao et al. | 360/77.12 |
| 6,943,979 B2 * | 9/2005 | Goker et al. | 360/77.12 |
| 7,072,133 B1 * | 7/2006 | Yip et al. | 360/53 |
| 7,206,161 B2 * | 4/2007 | Tateishi | 360/77.12 |
| 7,328,138 B1 * | 2/2008 | Trabert et al. | 702/191 |

* cited by examiner

*Primary Examiner*—Hoa T. Nguyen
*Assistant Examiner*—James L Habermehl
(74) *Attorney, Agent, or Firm*—William J. Kubida; Michael C. Martensen; Hogan & Hartson LLP

(57) ABSTRACT

Systems, computer implemented methodology, and computer readable media for measuring position error signal differential nonlinearity in timing based servo patterns. A set of two or more reading heads, positioned at various locations along a servo stripe and orientated transverse to the longitudinal motion of the tape, collect PES data concerning servo stripes. A differential between the two reading heads is examined at various locations along the servo stripe of the servo pattern to ascertain differential PES data regarding an area of interests along the servo stripe. Examination of the differential data is thereafter conducted to isolate systematic PES readings from nonsystematic PES readings. The nonlinearity of the systematic PES readings at the various locations along the servo stripe is measured so as provide the ability to compensate for the nonlinear differential PES associated with the non-ideal shape of servo stripes.

20 Claims, 9 Drawing Sheets

DETECTION AND MEASUREMENT OF POSITION ERROR SIGNAL LINEARITY IN TIMING BASED SERVO PATTERNS USING DIFFERENTIAL NONLINEARITY

BACKGROUND OF THE INVENTION

1. Field of the Invention

The present invention relates, in general, to timing based servo patterns that are laterally positioned on a linear data storage tape and, more particularly, to verification and measurement of nonlinearity of Position Error Signals in timing based servo patterns using differential nonlinearity.

2. Relevant Background

High density recording of digital information on magnetic tape continues to place more and more information on extremely narrow tracks. As technology progresses, it is reasonable to expect that thousands of tracks will exist on a single tape. Currently, tracks are on the order of 20 microns wide, yet to achieve storage densities on a tape cartridge in the order of 1-10 terra bytes (TB), track widths in the order of 5 to 1 microns will be necessary. Such high density recording accordingly requires the magnetic head tracking to be very accurate.

Servo signals developed from servo stripes written into the magnetic tape have long provided a means to accurately position the read/write heads over a track. Time-Based servo bands or patterns, which are written to the tape during the manufacturing process, are used as a reference to position all data tracks for the life of the cartridge. The servo pattern is comprised of a series of stripes that repeat down the length of the tape. The lateral positioning of a tape head in response to timing measurements based on the servo bands is well known in the art. Essentially, the read/write head is positioned based on timing of signals received from separate transducer heads of a timing based servo system that detects the servo stripes. In an actual drive, the recording head is mounted on a movable actuator and its position is constantly being monitored and corrected to compensate for lateral tape motion. The actuator is adjusted using a Position Error Signal ("PES"), which is the difference between the measured position computed from the servo pattern and the desired position of the head. PES is, therefore, essentially an indication of the position of the head as a function of the true or actual position of the head. Ideally, an insignificant (minimal) PES would signify that the indication where the head is corresponds to its actual location. Thus, when the head is properly registered, meaning the PES is sufficiently small, data tracks are written to the tape accurately. However, as the density of the tracks increase driving the tracks narrower and narrower, the need to accurately position the read/write head and minimize any PES is magnified. Certainly inaccuracies in the placement of the servo stripes with respect to one another becomes a significant factor in PES as does the consistent shape of each stripe.

The time-based servo stripe pattern is factory written as part of the tape build process using a servo write head. The servo write head is typically a mirror image of a single servo frame with two non-parallel write gaps on the recording surface. A pair of stripes are written simultaneously by pulsing the write head with current while transporting the tape on a precision tape deck. By controlling tape speed and the timing of the write pulses, the pattern is repeatedly stamped down the tape with precise control over fame to frame spacing. Unfortunately the process is not perfect and significant imperfections occur in each stamping.

Noise in a timing based servo systems for tracks larger than 20 microns is well known and has been studied extensively and even perfectly tracking a track on a tape will produce a certain amount of noise. Noise of this type is well known and there are a number of techniques for minimizing and compensating for the PES that is associated with such noise. A significant limitation of this type of analysis is that the servo bands, regardless of their shape and orientation, are typically assumed to produce a PES that is linearly perfect. Techniques exist that can address the linearity of the width of each stripe of the servo stripe series and determine how the PES varies as the cross track position along the band varies. Thus, when the curvature of the servo stripe is known, these analysis techniques can address such factors, but their applicability falters when the curvature of the servo stripes is unknown.

Determining the variations in the gaps in the servo write head and shape of the servo stripes on the tape is problematic. Historically, the low density of data, and thus the relatively thick nature of the data tracks, has been such that the PES introduced due to characteristics of the shape of the servo stripe has been insignificant or of minimal consequence in comparison to other sources of PES such as lateral tape motion or frame spacing error. However, as track density increases, the PES introduced by nonlinear characteristics, such as those induced by the shape of the servo stripes, becomes more and more problematic. And while current tape manufacturers that imprint the servo stripes on the tape have taken steps to limit the curvature of the stripes and make the shapes of the stripes consistent, no methods are known to exist to either verify that the stripes achieve required specifications or to address the PES issues that result from nonlinear servo stripe configurations.

As mentioned, there are several position errors associated with servo stripes beyond those induced by the actual shape of the stripe. One such error is referred to as the offset error. Offset error occurs when the measured position differs from the actual position by a fixed amount. When this error arises from the tape itself each drive sees the same error and misspositions data tracks by an equal amount. As long as the offset error is not too large the error does not present a problem. Another type of error is referred to as gain error. Gain error refers to a multiplication factor multiplied to the actual position. When the factor is not equal to one (1) the tracks can be placed to close together or to far apart. However, this error is easily analyzed by studying the difference in the reported positions between two widely space servo readers while reading the same servo band. Finally there is an error related to the non-linear relationship between the servo stripes measured position and the actual position that can cause the tracks to be placed to close together. This non-linear relation between the measured and actual position can result from the imperfect shape of the servo stripes themselves, i.e. not being an ideal trapezoid. This type of error is referred to as Differential Non-linearity and is the subject of the present application.

SUMMARY OF THE INVENTION

Systems, computer implemented methodology, and computer readable media for measuring position error signal differential nonlinearity in timing based servo patterns. A set of two or more reading heads, positioned at various locations along a servo stripe and orientated transverse to the longitudinal motion of the tape, collect PES data concerning servo stripes. A differential between the two reading heads is examined at various locations along the servo stripe of the servo pattern to ascertain differential PES data regarding an area of interest along the servo stripe. An examination of the differential data is thereafter conducted to isolate systematic PES readings from nonsystematic PES readings. The nonlinearity of the systematic PES readings gained at the various locations along the servo stripe is measured so as to provide the ability to compensate for the nonlinear PES associated with small changes in the shape of servo stripes.

Another aspect of the present invention is the orientations of two read heads used to collect servo stripe PES readings. The read heads, according to one embodiment of the present invention, are orientated perpendicularly transverse to the longitudinal direction of tape motion and spaced approximately one track pitch apart. In one particular embodiment of the present invention, the read heads are spaced 9 microns apart and constructed using multiple layers comprising a single substrate.

In another aspect of the present invention, PES data is collected at each location along the servo stripe via multiple passes of the servo pattern. Once data for that particular location has been obtained, the set of read heads is repositioned to a different location and additional data is collected. In other embodiments, a sinusoidal scan of the servo stripe is conducted to collect data at the various locations along the servo stripe. In yet another embodiment of the present invention, multiple combinations or sets of read heads are positioned along the servo stripe to collect data at various locations simultaneously.

The foregoing and other features, utilities and advantages of the invention will be apparent from the following more particular detailed description of the invention. The features and advantages described in this disclosure and in the following detailed description are not all-inclusive and, particularly, many additional features and advantages will be apparent to one of ordinary skill in the relevant art in view of the drawings, specification, and claims hereof Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
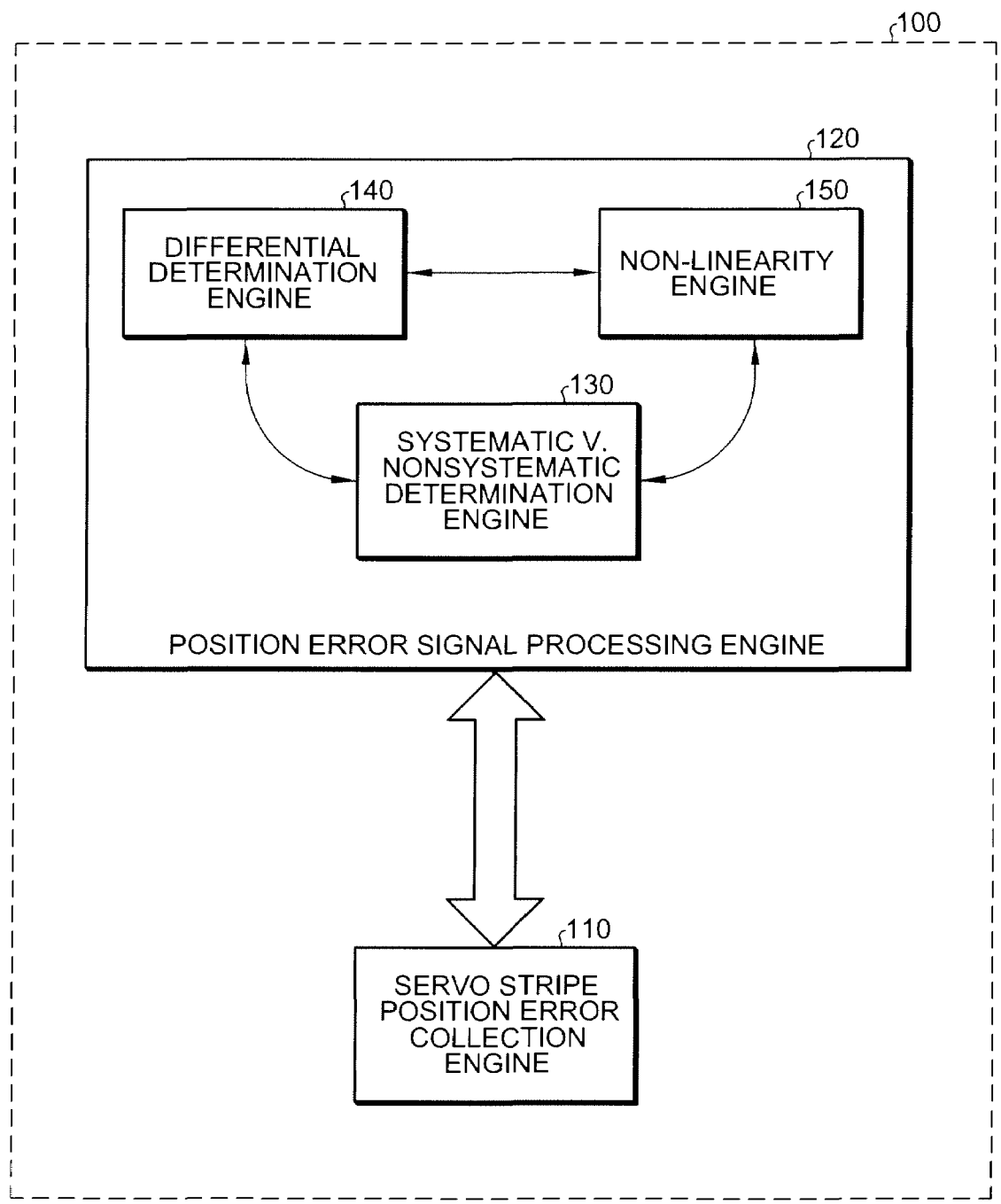
FIG. 1 shows a high level block diagram of a system for measuring position error signal differential nonlinearity in timing based servo patterns according to one embodiment of the present invention.

Systems, computer implemented methodology, and computer readable media for measuring position error signal differential nonlinearity in timing based servo patterns according to the present invention are described in terms of the aforementioned figures. FIG. 1 shows a high level block diagram of a system 100 for measuring position error signal differential nonlinearity in timing based servo patterns according to one embodiment of the present invention. A differential nonlinearity measurement system 100 collects Position Error Signal ("PES") data concerning the linearity of servo stripes measurements associated with a servo pattern and ascertains the degree of nonlinearity and its impact to the overall determination of PES and track head position.

The differential nonlinearity measurement system 100 includes a servo stripe Position Error Signal collection engine 110 and a Position Error Signal processing engine 110 120. The PES processing engine 120 further comprises engines for determination of systematic versus nonsystematic PES 130, differential PES 140, and PES nonlinearity 150. It is to be understood that although the differential nonlinearity measurement system 100 is illustrated as a single entity, as the term is used herein, a differential nonlinearity measurement system 100 refers to a collection of functionalities which can be implemented as software, hardware, firmware or any combination of these. Where a differential nonlinearity measurement system 100 is implemented as software, it can be implemented as a standalone program, but can also be implemented in other ways, for example, as part of a larger program, as a plurality of separate programs, as one or more device drivers or as one or more statically or dynamically linked libraries.

The differential nonlinearity measurement system 100 of FIG. 1 collects, analyzes and measures Position Error Signals due to the non-ideal shape of servo stripes. The collection engine 110 comprises a set of reading heads orientated in a fixed position so as to gain PES measurements based on the passing of a set of servo stripes. As the tape possessing the servo stripes moves in a longitudinal direction, a set of reading heads measures the passing of the stripes. For a particular position along the servo stripe, the collection engine 110 via the readers collects data regarding the distance between the two readers as measured by PES. As data is collected by the collection engine 110 from other locations along the servo stripe, it is analyzed by the processing engine 120. One portion of the processing engine 110 measures, independently, the PES value for each read head. The difference between these PES values is the output of the differential determination engine 140. While PES measurements are normally based on the leading edge of the servo stripes, other embodiment of the present invention can measure PES based on the passing of the trailing edge of the servo stripes or any combination thereof. The PES collected from the various locations comprises systematic and nonsystematic error. The systematic versus nonsystematic determination engine 130 filters nonsystematic contributions to PES and passes the systematic PES to the nonlinearity engine 150. The differential PES data is then analyzed by the nonlinearity engine 150 to determine whether the servo stripe possesses non-ideal characteristics.

Figure 2:
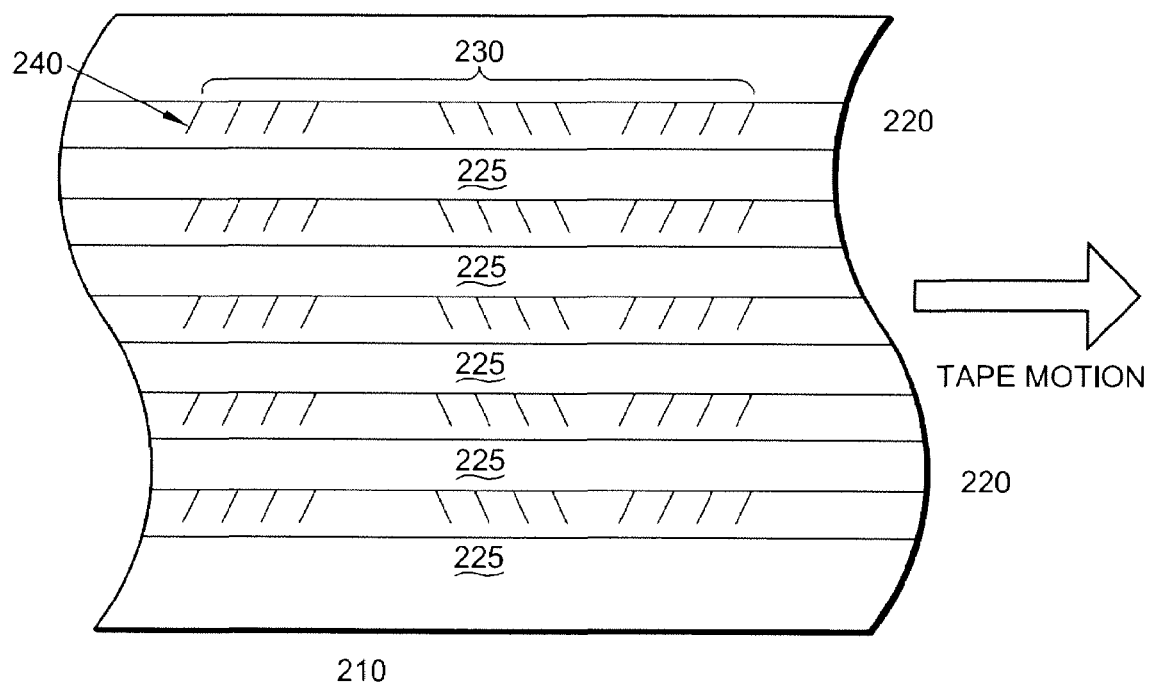
FIG. 2 show a section of magnetic tape having a plurality of servo patterns as is known in the prior art.

In the text that follows, each aspect of the differential nonlinearity measurement system 100, as well as its methodology, is described in specificity. The servo stripe PES collection engine 110 gathers data regarding the linearity of PES associated with servo stripe shape. FIG. 2 shows a section of magnetic tape having a plurality of servo patterns as is known in the prior art. As previously described, the servo pattern is created during tape build by a servo write head. Ideally, as the tape 210 passes before the servo write head, a series of servo stripes 240 are written into the various tracks 220 on the tape creating a servo pattern 230. Data tracks are located between the servo patterns as the servo pattern serves to position the read/write head accurately over the data track 225 associated with a particular servo pattern 230.

Figure 3:
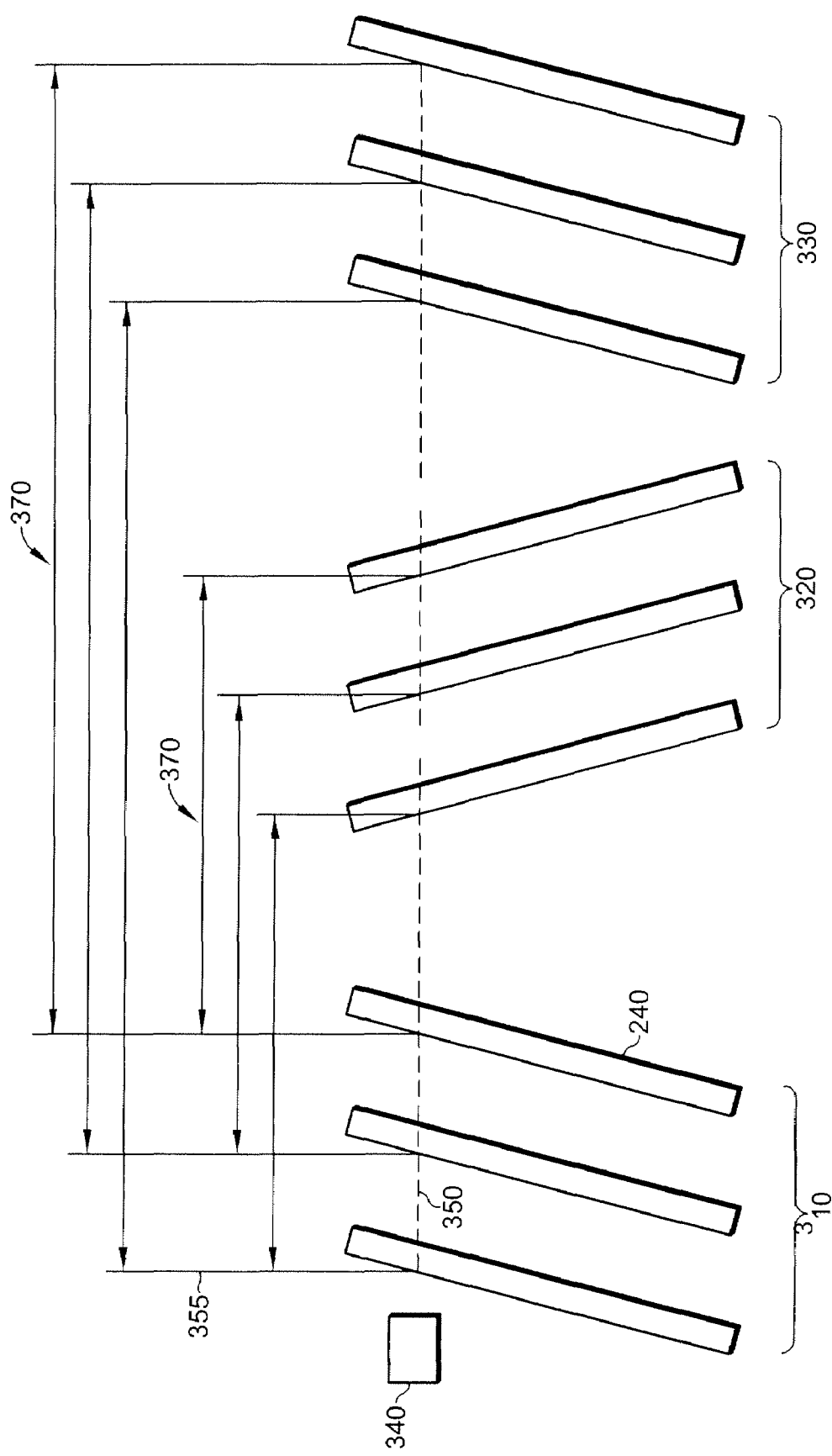
FIG. 3 shows an expanded view of three ideal servo stripe sets and a reader for measuring position error signal differential nonlinearity in timing based servo patterns according to one embodiment of the present invention.

FIG. 3 shows an expanded view of three ideal sets of servo stripes 310, 320, 330 and a set of reading heads 340 for measuring position error signal differential nonlinearity in timing based servo patterns according to one embodiment of the present invention. It is significant to note that in FIG. 3 each of the servo stripes 240 are assumed to be comprised of perfect rectangles orientated, within each burst, at an identical slight angle. In another embodiment of the present invention, the servo stripes can be trapezoidal in shape. The assumption critical to the present invention is that regarding the long leading or trailing edge of each servo stripe. That assumption is that the edge of the servo stripe is a straight line oriented at a desired slight angle. The invalidity of these assumptions are the focus of the present invention. According to one embodiment of the present invention, data regarding the shape of each servo stripe 240 is collected by a set of reading heads 340. In the present embodiment, the reading heads 340 are positioned at a fixed distance apart as measured transverse to the direction of tape motion. The heads 340 are ideally perfectly aligned in a plane perpendicularly transverse to tape motion or are aligned with minimal longitudinal displacement.

In one embodiment of the present invention two reading heads are constructed from a single substrate using separate layers. The first head is positioned on a first layer of the substrate and a second, or subsequent heads, are positioned on second or subsequent layers. The layers of the substrate can be positioned so as to space apart the reading heads 340 by as little as 2 microns. The corresponding distance transverse to tape motion can be varied as required by the track density being measured by the reading heads. In one embodiment of the present invention, the distance between a set of the reading heads transverse to tape motion is one track pitch. Current track densities, and thus current track pitches, suggest that a reading head 340 spacing of 9 microns is preferred to ascertain PES readings bearing on differential nonlinearity.

In other embodiment, the reading heads 340 may be constructed using separate substrates that are then orientated with respect to on another to produce the desired reading head 340 set orientation. While the present invention is described in terms of two reading heads that are positioned at two or more locations along the servo stripe 240, the present invention can equally be carried out by using multiple reading heads to collect servo stripe 240 data simultaneously.

The set of readers 340 shown in FIG. 3 are positioned near the top of the servo pattern. The nonlinear nature of the PES associated with the non-ideal shape of the servo stripe 240 is determined by making similar PES measurements at various locations along the servo stripe pattern. While FIG. 3 shows only one such location, the reader should note that other locations, such as the middle and lower portion of the servo stripe, are also examined to collect data regarding the shape of the servo stripe 240 along its entire length.

Extending to the right of the reading heads 340 is a dashed line 350 representing the track of the heads 340 as the tape moves in the longitudinal direction. As each reading head 340 passes the leading edge of the servo stripe 240, the stripe is detected as indicated by the dotted vertical lines 355. Each servo stripe 240 possesses an angle typically near seven degrees as recognized by the pair of read heads. As the reading heads 340 are minimally displaced with respect to the longitudinal motion of the tape, the motion of the tape, and the angle of the stripes results in the measurement of different timing intervals 370 between corresponding stripes of each set of servo stripes 310, 320, 330 for each read head from which PES can be calculated.

The stripes 240 and the servo stripe sets 310, 320, 330 depicted in FIG. 3 are, as mentioned, ideal. The geometries of each stripe and the angles at which the stripes are placed are assumed to be perfect. Each stripe possesses crisp definite boundaries and each stripe 240 is consistently reproduced. In the stripe configuration presented in FIG. 3, the PES determined at the various locations along the stripe 240 will be linearly related. Thus while the PES measured at any position along the stripe will be unique, it will be linearly related to any other PES measurement and therefore easily compensated for with respect to accurately positioning the track. Unfortunately, the real world process of building stripes into actual magnetic tape is not as ideal as that pictured in FIG. 3.

Figure 4:
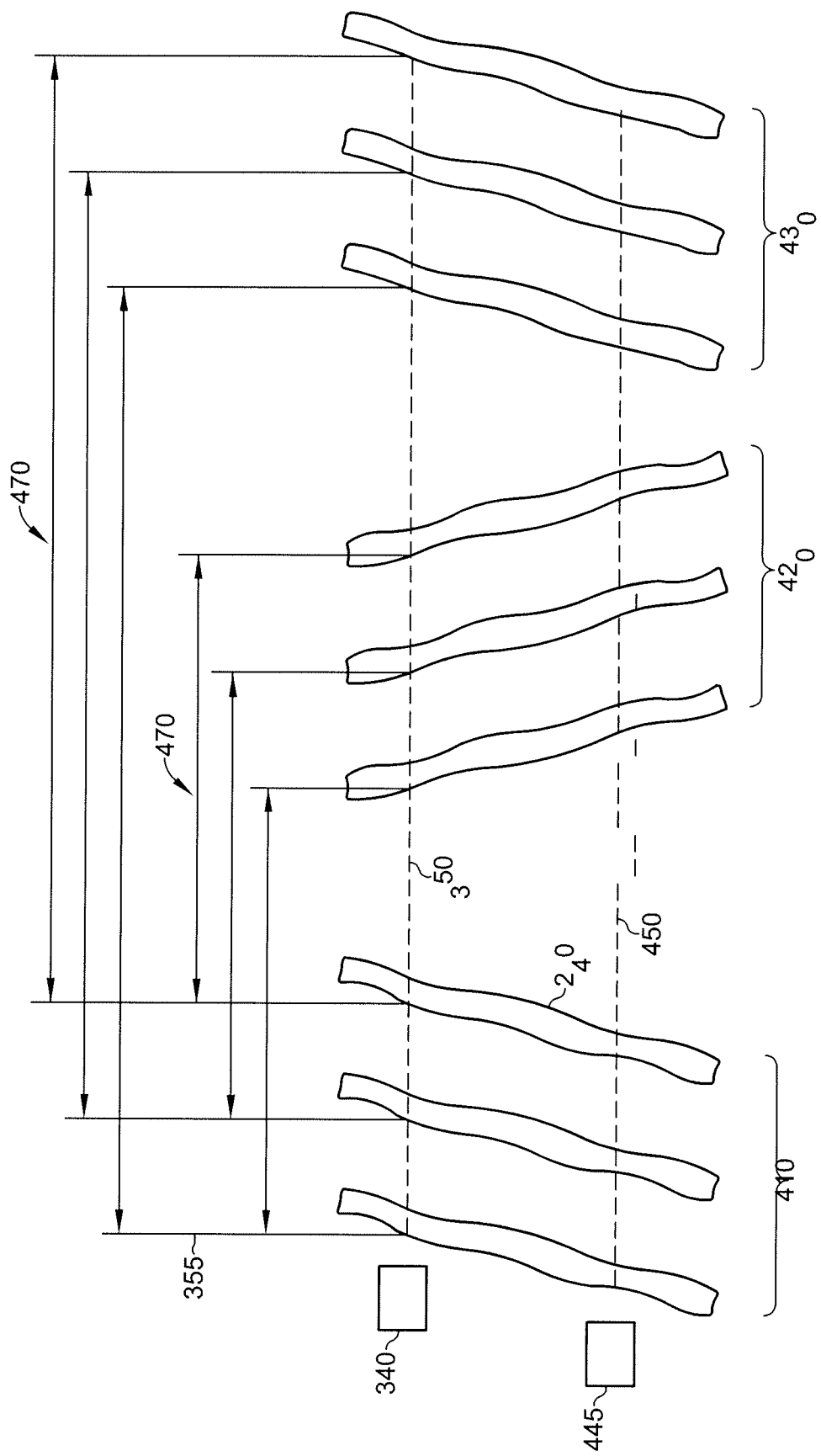
FIG. 4 shows an expanded view of three abstract non-ideal servo stripe sets and a reader for measuring position error signal differential nonlinearity in timing based servo patterns according to one embodiment of the present invention.

FIG. 4 shows an expanded view of three abstract real world servo stripe sets 410, 420, 430 and a set of readers 340 for measuring position error signal differential nonlinearity in timing based servo patterns according to one embodiment of the present invention. The servo stripes 440 shown in FIG. 4 are clearly distorted as compared to those of FIG. 3. The distortions shown in FIG. 4 are, however, consistent with respect to each stripe as is characteristic with the manufacturing process. That is, there are distortions or aspects of curvature in the servo stripe that are representative of imperfections in the servo build process introduced by the servo write head. It is widely understood by one skilled in the relevant art that such distortions occur, however, the significance of these distortions were not appreciated until track density increased making track pitches approach 20 microns or less.

FIG. 4 shows a set of reading heads 340, 445 at two locations, an upper location and a lower location, with the heads at each location displaced transversely with respect to the longitudinal tape motion. In the example illustrated in FIG. 4 readings from each set of readers are taken as the tape is set in motion. A set of read heads 445 at the lower position detects passing of the leading edge of the servo stripe 240 of the first servo stripe set 410 (or burst as they are sometimes called)

causing the collection engine 110 to collect data, toward the determination of a PES value, from time interval measurements between the servo stripe set 410 and subsequent servo stripe sets 420, 430. While FIG. 4 only shows time intervals 470 for the upper read head, similar time intervals can be measured, and thus a PES value determined, for the lower set of read heads. However, the irregular shape of, in this case, the leading edge of sets of servo stripes, results in the PES values determined at the various positions along the servo stripe to be nonlinearly related.

As an example consider one embodiment of the present invention wherein the same set of reading heads is repositioned to a different upper position 340 to measure the time interval between the sets of servo stripes 410, 420, 430. In another embodiment, a set of multiple pairs or sets of read heads may be orientated so as to take measurements at multiple locations along the stripe simultaneously. Once repositioned to the upper location, the set of reading heads 340 again measures the time interval between the passing of the stripe for each set 410, 420, 430. Again a PES value is determined. However, in this case the PES values determined at the various locations along the servo stripe are not linearly related. Unlike the ideal scenario shown in FIG. 3, the time interval 470, and thus the PES, varies along the length of the stripe in a relationship that is nonlinear. The PES value measured for each read heads 340 at any one location is significantly different from the values determined at other locations and these PES measurements do not vary with any linearly relationship. These nonlinear differences induce error in the PES and this error into the accurate positioning of the read/write head.

To better understand the collection of PES data, consider the scenario where an ideal servo pattern is read by a set of two readers positioned 9 microns transversally apart with respect to the direction of tape motion. As the set of readers is moved to various locations laterally with respect to the longitudinal tape motion, the readers provide a set of PES values. As each reader produces a value, the set of values for six different locations may be −70/−61, −66/−57, −35/−26, −4/5, 30/39, 70/79. Discounting any nonsystematic PES error, i.e. noise, each reading is 9 microns apart; i.e. the are linearly related. The results show a constant difference between the readings that is consistent with ideal servo stripes.

In contrast, readings from a non-ideal servo pattern may be more representative of −70/−61, −66/−55, −30/−24, −6/5, 29/38, 70/78. In this non-ideal example, the apparent distance between the reading heads varies from 11 to 6. The error introduced by these distortions can significantly misalign the data reading head due to a misinterpretation of the PES. Recall that PES is typically assumed to be linear along the servo stripe thus depending on what portion of the stripe is used to position the read/write head, the actual position may be significantly in error. While the error is different at each location, the error is nonetheless systematic over all of the servo stripes. And as the errors are systematic, the errors can be compensated so as to achieve precise head positioning regardless of where along the servo stripe the reading head is collecting positioning data.

Figure 5:
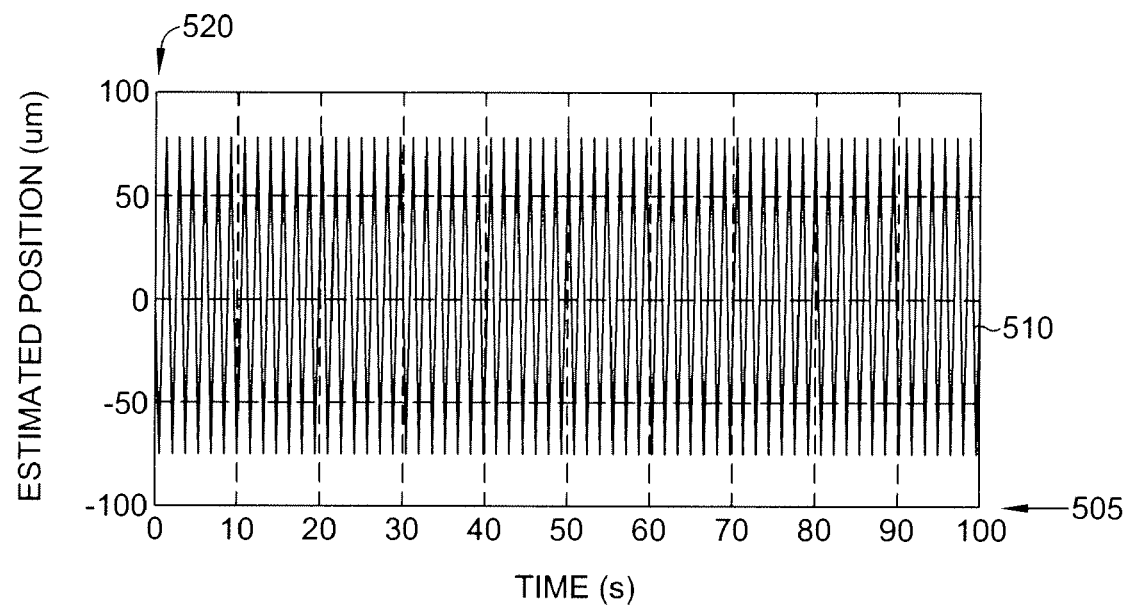
FIG. 5 shows a graphical representation of PES measurements from a set of read heads at a particular location according to one embodiment of the present invention.
Figure 5:
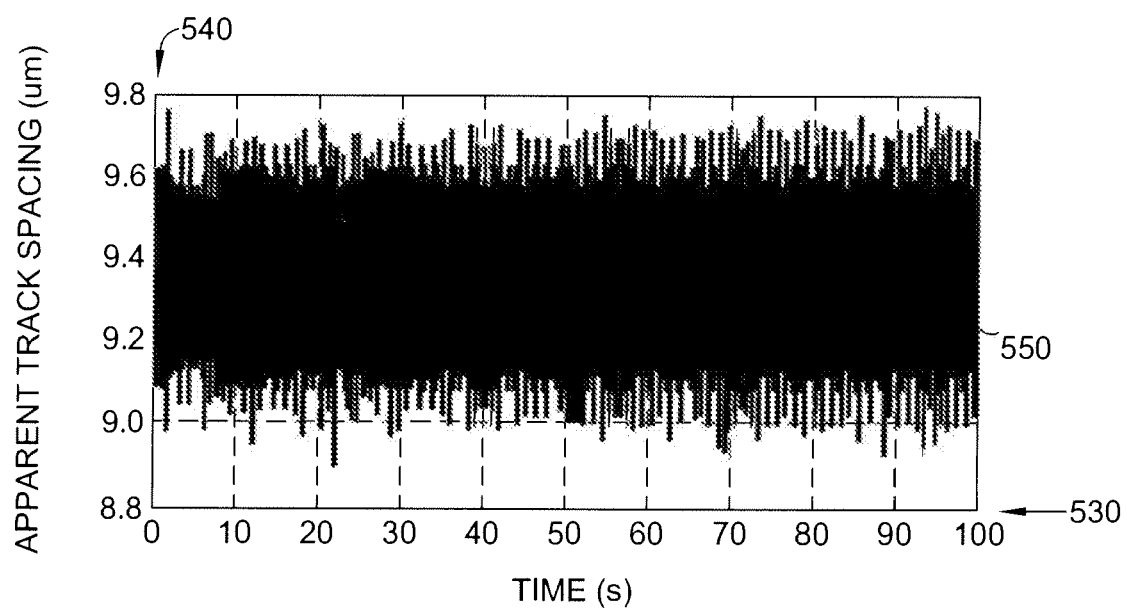

As described herein, the data collected by the collection engine 110 is processed by three processing engines 120 working in concert. As the set of read heads 340 is placed at various positions laterally with respect to tape motion, the read heads provide PES readings that are interpreted as the apparent distance between the heads. As will be appreciated by one skilled in the art, readings of PES involve a certain degree of signal error known as noise. Noise is nonsystematic error produced by the various components and the environment in which the measurements are taken. The random nature of the noise makes is possible to discount its significance, however, nonsystematic noise can sometime mask systematic error. FIG. 5 shows two graphical representations of the same PES measurement from a set of read heads at a particular location according to one embodiment of the present invention. The upper graphical display 510 represents raw data of the estimated position of the heads during repeated passes of the servo pattern as time varies from zero to 100 seconds depicted on the horizontal axis 505 and the estimate position of the heads varies from −100 to 100 microns shown on the vertical axis 520. The lower graphical display 550 represents the apparent track spacing as determined from the servo pattern information. Again the graph varies from 0 to 100 seconds shown on the horizontal axis 530 with the values of the apparent track spacing varying from 8.8 to 9.8 microns depicted on the vertical axis 540. As can been seen from the lower graph 550, the apparent track spacing is not a definite number. Instead, for this one location of interest of the servo stripe, the apparent track spacing between the two read heads varies from almost 9.8 microns to 8.9 microns with an approximate mean of 9.3 microns. These graphs significantly show that a statistical value for distance between the read heads can be determined based on multiple passes of the read heads and data collection by the collection engine 110, and that such data comprises a significant amount of noise.

Figure 6:
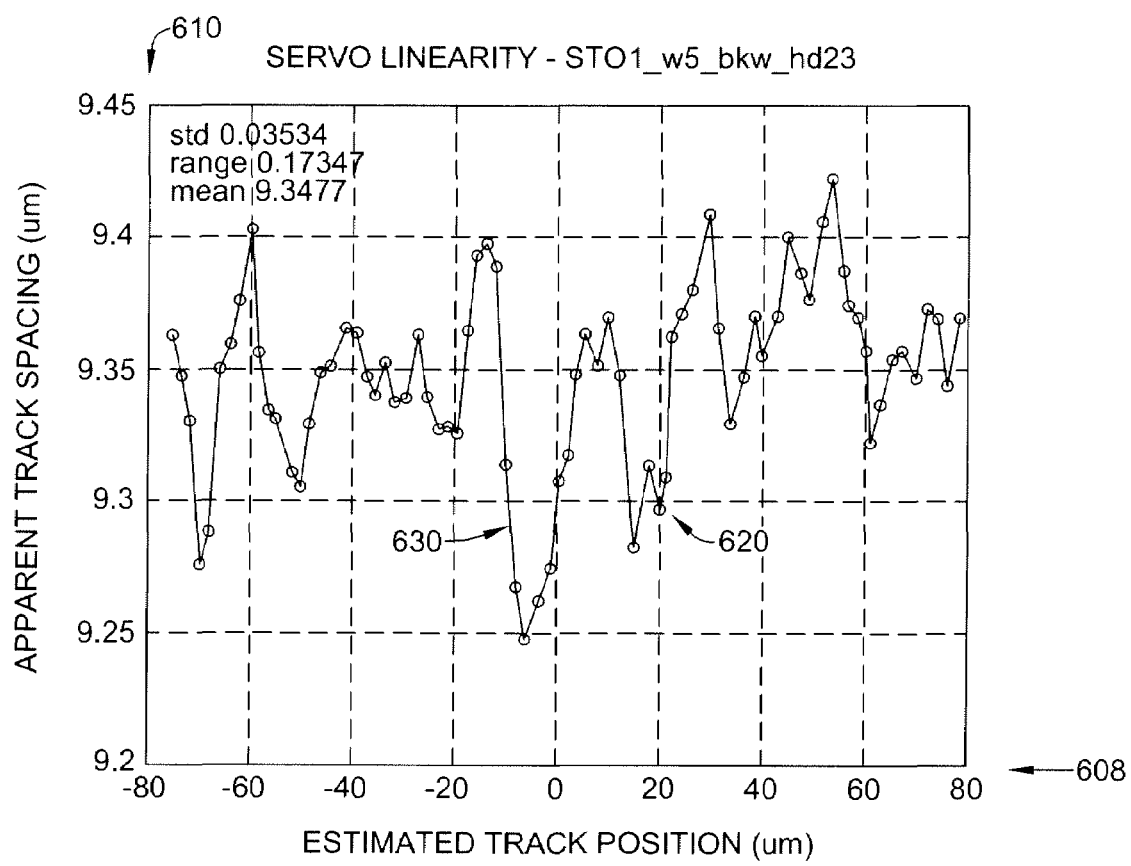
FIG. 6 shows a graphical representation, mean, and standard deviation of differential measurements from a set of read heads at several locations along one particular servo stripe pattern of a tape according to one embodiment of the present invention.

The data is processed by the position error signal engine 120 to ascertain a mean PES value for each location along the servo stripe. FIG. 5 represents one location of the set of read heads 315 with respect to one track of servo patterns on a particular tape. In the example of FIG. 5, the mean apparent track spacing is approximately 9.3 microns. FIG. 6 shows a graphical representation and the mean, and standard deviation of the differential measurements of a set of read heads at several locations along one particular servo stripe pattern of a tape according to one embodiment of the present invention. The graph of FIG. 6 displays the estimated track position along the same stripe varying from −80 to 80 microns (shown on the horizontal axis 605) versus the apparent track spacing between the read heads varying from 9.2 to 9.45 microns for a single servo pattern (shown on the vertical axis 610). The data collected and displayed in FIG. 5 representing a mean value of 9.3 microns, is shown on FIG. 6 as a single data point 620 at an estimate track position of 20 microns and an apparent track spacing of 9.3 microns. Each of the points shown on the graph of FIG. 6 represent different lateral locations of interest along an individual servo pattern. Affiliated with each point is a band of uncertainty to present to a viewer a graphical representation of the variance of the data around that particular point. The line connecting the points 630 represents a collection of mean values for this particular servo pattern.

Figure 7:
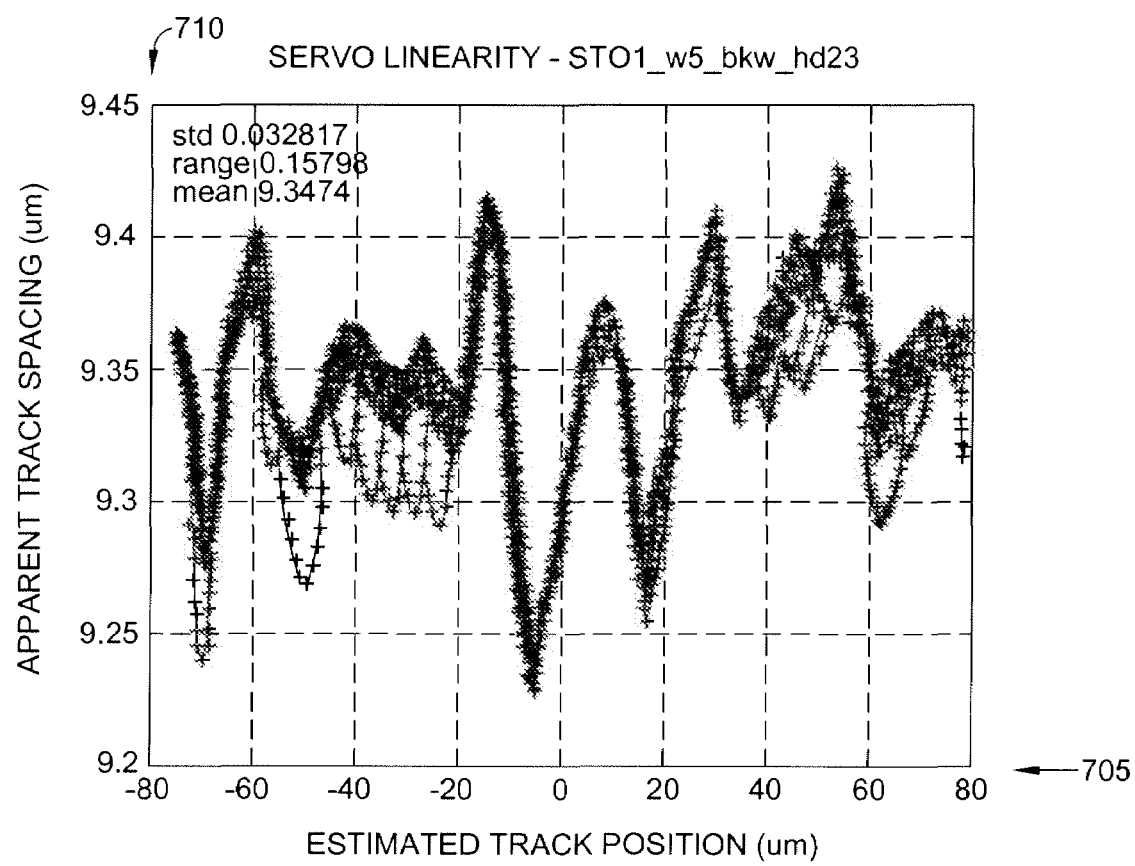
FIG. 7 shows a graphical representation, mean, and standard deviation of differential measurements from a set of read heads at several locations along the servo stripe pattern of FIG. 6 according to another embodiment of the present invention.

FIG. 7 shows a graphical representation and the mean and standard deviation of differential measurements of a set of read heads at several locations along the servo stripe pattern of FIG. 6 according to an alternate process embodiment of the present invention. Again the graphical display places estimated track position on the horizontal axis 705 and the apparent track spacing on the vertical axis 710. In the embodiment shown in FIG. 7, the results of PES associated track spacing were obtained by using a sinusoidal sweep of the locations along the servo pattern. While the data is not as definite as that of continuous data collected at each location that is thereafter combined as shown in FIG. 6, the data nonetheless reveals that the deviation of the apparent track spacing is systematic about the mean. These and other implementation methodologies for collecting PES readings can be successfully utilized by the differential nonlinearity measurement system 100. Such implementation methodologies are known within the art and the specifics of their application within the context of the present invention will be readily apparent to one of ordinary skill in the relevant art in light of this specification. In both process embodiments, the apparent track spacing mean was approximately 9.347 microns and in each methodology the pattern of variance was essentially the same.

The data presented in FIGS. 6 and 7 reveal a component of PES that is systematic and nonlinear. By combining the functionality of the differential determination engine 140, the systematic versus nonsystematic engine 130 and the nonlinearity engine 150, the processing engine 120 can identify, and when necessary compensate for, position error due to systematic non-ideal curvatures in servo stripes. By understanding and knowing the PES systematic non-ideal characteristics of servo stripes in a servo pattern, a better value for the head's true position based on a best case estimated position can be obtained. This compensation in head positioning allows the read/write head to obtain a new degree of accuracy despite manufacturing distortions in the servo stripes that may otherwise comprise accurate placement of read/write heads.

Figure 8:
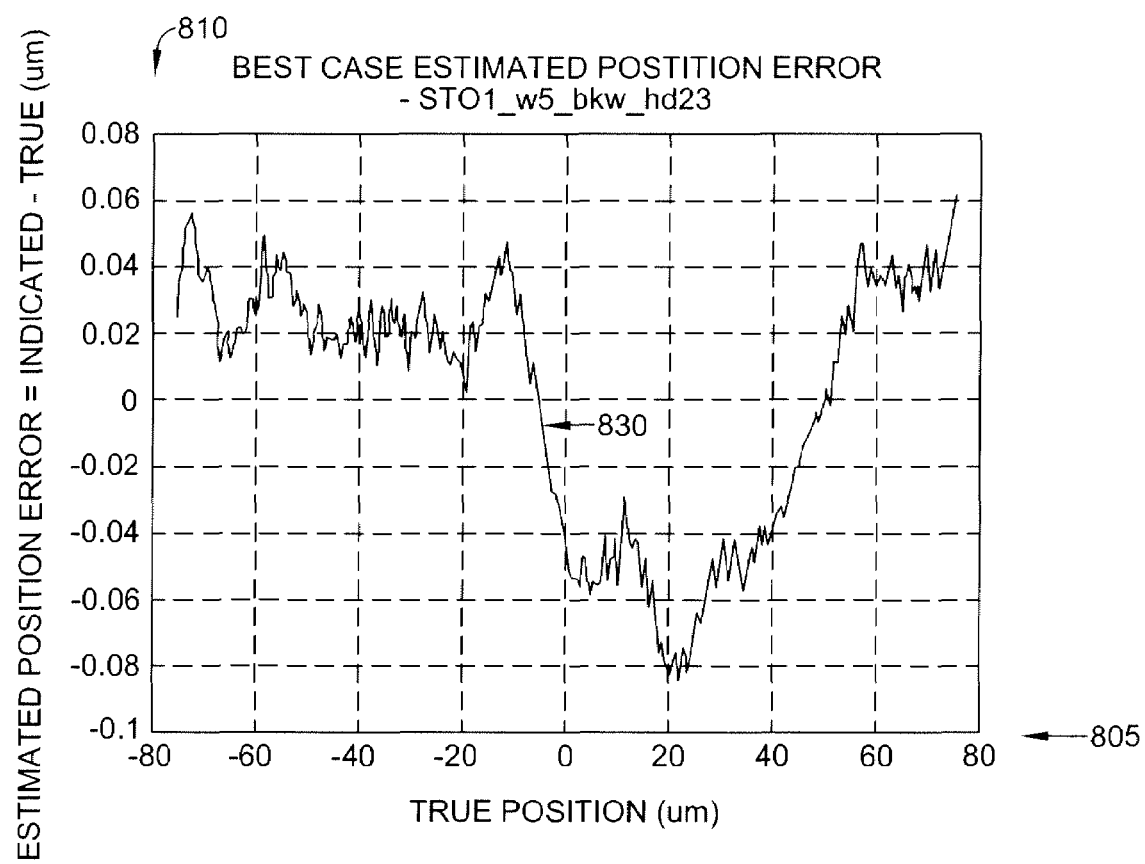
FIG. 8 shows a graphical representation of the error in estimated head position as a function of true head position according to one embodiment of the present invention.

FIG. 8 shows a graphical representation of the estimated position error as a function of true position according to one embodiment of the present invention. Based on the collection of PES data and its analysis, embodiments of the present invention for measuring position error signal differential nonlinearity in timing based servo patterns can provide head positioning mechanisms with information necessary for the accurate placement of the head. The graph depicted in FIG. 8 reflects the systematic error that distortions of a particular servo stripe pattern can induce into the positioning mechanism of the read/write head. The horizontal axis of the graph 805 represents the true position of the head while the vertical axis 810 represents the estimated position error as a function of the indicate position less the true position. The values 830 shown by FIG. 8 represent the error induced in the head positioning mechanism from small differences in the shape of the edges of servo stripes. These small differences are responsible for nonlinearity in PES.

Figure 9:
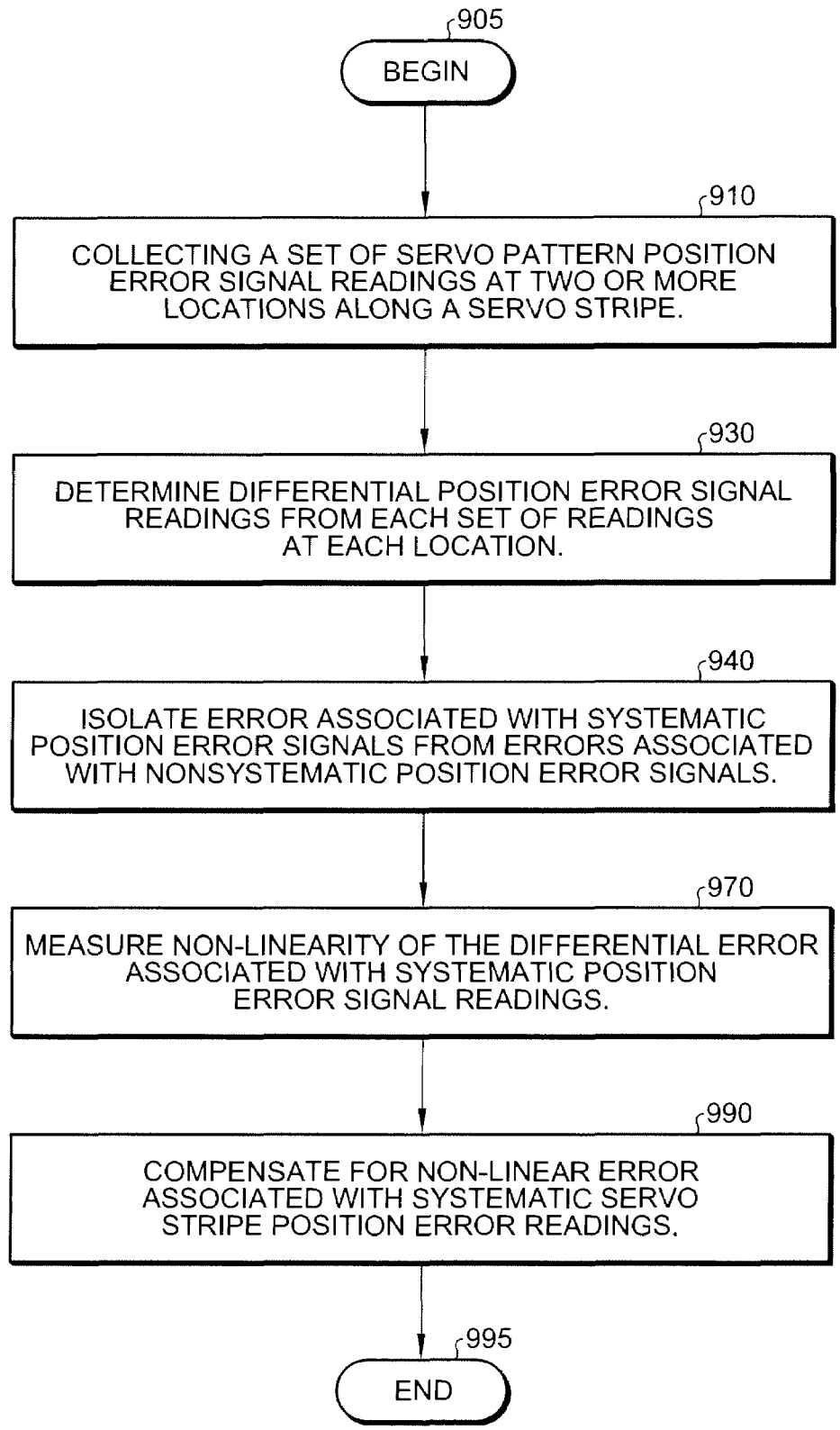
FIG. 9 shows a high level flow chart of one method embodiment for measuring position error signal differential nonlinearity in timing based servo patterns according to the present invention.

A flow chart of one embodiment of the present invention for a method to measuring differential PES nonlinearity in servo based patterns is shown in FIG. 9. The method begins 905 by collecting 910 a set of servo pattern PES readings at two or more locations along a servo stripe. The collection of these readings is accomplished in one embodiment by positioning two read heads approximately one track pitch apart, orientated perpendicularly transverse to the longitudinal tape motion. Track pitches vary depending on the density of the number of tracks on the tape, but a pitch, and thus head spacing, on the order of 9 microns provides a good platform by which to collect differences in the shape of the servo stripe that may impact read/write head positioning. Of course other orientations and spacing of the read heads are possible and are contemplated by the present invention. Once the set of read heads is positioned at a location of interest along the servo stripe pattern, multiple data points are collected. After sufficient data at one location along the servo stripe is collected, the location is altered and the process repeats, collecting multiple data point pairs of PES for that location. The process continues until the entire length of interest of the servo stripe has been examined and sufficient data has been collected.

From each location, each read head produces a PES value. A differential PES reading is determined 930 from each set of readings at each location. The result is a collection of differential PES readings for each location. The differential PES readings for each location are examined to isolate 960 error in each reading associated with systematic PES and errors associated with nonsystematic PES or noise. The result of the examination is a mean differential PES value for each location along the stripe with its associated standard deviation. The differential PES values are then further examined to ascertain 970 whether the mean values of differential PES exhibit any characteristics of nonlinearity. As shown in the previous Figures, the systematic PES differential values collected at various locations along a servo stripe consistently produce nonlinear characteristics. These nonlinear characteristics can be modeled, and thereafter compensated for, using techniques known to one skilled in the art.

The measuring of differential PES nonlinearity in servo based patterns provides information about the accuracy of the head position information provided by the servo pattern. By knowing the nonlinearity associated with each servo based pattern, adjustments 990 in the head positioning mechanisms can be implemented to produce an accurate and precise positioning of the head over a desired track.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer implemented method for measuring position error signal nonlinearity in timing based servo patterns, the method comprising:

collecting a set of servo pattern position error signal readings at two or more locations along a servo stripe;

determining a differential position error signal from the set of servo pattern position error signal readings at each of the two or more locations along the servo stripe; examining the differential position error signal at the two or more locations along the servo stripe so as to isolate error associated with systematic position error signal readings from error associated with nonsystematic position error signal readings; and measuring nonlinearity of the differential error associated with systematic position error signal readings at the two or more locations along the servo stripe.

2. The method of claim 1, wherein the two or more locations are along the servo stripe transverse to tape motion.

3. The method of claim 1, wherein measuring nonlinearity of the differential error produces a differential error measurement used to qualify servo written cartridges, qualify servo write heads, and/or compensate for differential nonlinear errors.

4. The method of claim 1, wherein collecting the set of servo pattern position error signal readings includes reading position error signal readings from two or more position error signal reading heads orientated with respect to each other transverse to tape motion.

5. The method of claim 4, wherein the two or more reading heads are spaced approximately one track pitch apart.

6. The method of claim 5, wherein one track pitch is between 1 and 14 microns.

7. The method of claim 5, wherein one track pitch is 9 microns.

8. The method of claim 4, wherein a first of the two or more position error signal reading heads is built on a first layer of a substrate and a second of the two or more position error signal reading heads is built on a second layer of the substrate so as to minimize spacing parallel to tape motion between the first and the second position signal error reading heads.

9. The method of claim 4, wherein a first of the two or more position error signal reading heads is built on a layer of a first substrate and a second of the two or more position error signal reading heads is built on a layer of second substrate and wherein the first substrate and the second substrate are orientated so as to minimize spacing parallel to tape motion between the first and the second position error signal reading heads.

10. The method of claim 1, wherein determining the differential position error signal comprises subtracting position error signal readings from a first position error signal reading head from position error signal readings from a second position error signal reading head.

11. The method of claim 1, wherein examining distinguishes error associated with nonsystematic position error signal readings from the differential position signal error.

12. The method of claim 1, wherein systematic position signal error readings are differences between the differential position error signal obtained from readings at the two or more locations of the servo stripe.

13. The method of claim 1, wherein nonsystematic position error signal readings comprises tape/band noise and reading pair noise.

14. A computer system for measuring position error signal nonlinearity in timing based servo patterns, comprising:
a machine capable of executing instructions embodied as software;
a plurality of software portions of the software, wherein one of said software portions is configured to collect a set of servo pattern position error signal readings at two or more locations along a servo stripe;
one of said software portions is configured to determine a differential position error signal from the set of servo pattern position error signal readings at each of the two or more locations along the servo stripe;
one of said software portions is configured to examine the differential position error signal at the two or more locations along the servo stripe so as to isolate error associated with systematic position error signal readings from error associated with nonsystematic position error signal readings; and
one of said software portions is configured to measure nonlinearity of the differential error associated with systematic position error signal readings at the two or more locations along the servo stripe.

15. The system of claim 14, wherein the one of said software portions configured to collect the set of servo pattern position error signal readings further comprises a software portion configured to read position error signal readings from two or more position error signal reading heads orientated with respect to each other transverse to tape motion.

16. The system of claim 15, wherein the two or more reading heads are spaced approximately one track pitch apart.

17. At least one computer-readable medium containing a computer program product for measuring position error signal nonlinearity in timing based servo patterns, the computer program product comprising:
program code for collecting a set of servo pattern position error signal readings at two or more locations along a servo stripe;
program code for determining a differential position error signal from the set of servo pattern position error signal readings at each of the two or more locations along the servo stripe;
program code for examining the differential position error signal at the two or more locations along the servo stripe so as to isolate error associated with systematic position error signal readings from error associated with nonsystematic position error signal readings; and
program code for measuring nonlinearity of the differential error associated with systematic position error signal readings at the two or more locations along the servo stripe.

18. The computer-readable medium containing a computer program product of claim 17, further comprising program code for compensating for nonlinear differential error associated with systematic position error signal readings.

19. The computer-readable medium containing a computer program product of claim 17, wherein the program code for collecting the set of servo pattern position error signal readings further comprises program code for reading position error signal readings from two or more position error signal reading heads orientated with respect to each other transverse to tape motion.

20. The computer-readable medium containing a computer program product of claim 19, wherein the two or more reading heads are spaced approximately one track pitch apart.

* * * * *